United States Patent
Ceelen

(10) Patent No.: US 8,156,629 B2
(45) Date of Patent: Apr. 17, 2012

(54) SELF-ALIGNING UTILITY AUTOCOUPLER

(75) Inventor: Hans Peter Theodorus Ceelen, Rio Vista, CA (US)

(73) Assignee: Applied Materials, Inc., Santa Clara, CA (US)

( * ) Notice: Subject to any disclaimer, the term of this patent is extended or adjusted under 35 U.S.C. 154(b) by 429 days.

(21) Appl. No.: 12/570,739

(22) Filed: Sep. 30, 2009

(65) Prior Publication Data

US 2010/0077593 A1 Apr. 1, 2010

Related U.S. Application Data

(60) Provisional application No. 61/101,319, filed on Sep. 30, 2008.

(51) Int. Cl.
*B23Q 3/00* (2006.01)
*H01R 13/64* (2006.01)

(52) U.S. Cl. ........... 29/464; 29/466; 29/729; 29/758; 29/271; 29/281.5; 439/378; 439/374

(58) Field of Classification Search ........... 29/464, 29/465, 466, 468, 559, 700, 729, 757, 758, 29/760, 271, 281.1, 281.5; 439/378, 374
See application file for complete search history.

(56) References Cited

U.S. PATENT DOCUMENTS

| | | | | |
|---|---|---|---|---|
| 3,565,161 A | * | 2/1971 | Lindsey | 164/312 |
| 5,002,500 A | * | 3/1991 | Zuccaro et al. | 439/348 |
| 5,054,181 A | * | 10/1991 | Nagasawa | 29/281.1 |
| 5,385,481 A | * | 1/1995 | Kotyuk | 439/378 |
| 5,784,774 A | * | 7/1998 | Kajiwara | 29/758 |
| 6,224,121 B1 | * | 5/2001 | Laubach | 294/86.4 |
| 6,336,669 B1 | * | 1/2002 | Laubach | 279/3 |
| 7,198,699 B2 | | 4/2007 | Thomsen et al. | |
| 7,377,028 B2 | * | 5/2008 | Hasircoglu et al. | 29/741 |
| 2007/0228670 A1 | | 10/2007 | Norton et al. | |
| 2007/0228671 A1 | | 10/2007 | Norton | |

FOREIGN PATENT DOCUMENTS

| | | |
|---|---|---|
| JP | 6000683 | 1/1994 |
| JP | 2004338086 | 12/2004 |
| KR | 10-2004-0076883 | 9/2004 |
| WO | WO-03/064087 | 8/2003 |

OTHER PUBLICATIONS

Compliant Utility Couplers, website: <http://www.ati-ia.com/products/toolchanger/UtilityCoupler.aspx>.

PCT International Search Report and Written Opinion dated Mar. 31, 2010 for International Application No. PCT/US2009/058923. (APPM/013770 PCTP).

* cited by examiner

*Primary Examiner* — Essama Omgba
(74) *Attorney, Agent, or Firm* — Patterson & Sheridan, LLP

(57) ABSTRACT

An apparatus and method for coupling utilities is provided. In one embodiment, an apparatus for coupling utilities comprises a lower plate supported by a box, the plate having an aperture, at least one preloaded spring, at least one utility connection component, and a primary alignment pin projecting from a first surface of the plate; and an upper plate having a secondary alignment pin shorter than the primary alignment pin projecting from a first surface of the upper plate, an aperture and at least one utility connection component. The upper plate can move toward the lower plate with the first surfaces of the plates facing one another so that the primary alignment pin passes through the aperture in the upper plate and the secondary alignment pin passes through the aperture in the lower plate, the at least one preloaded spring is compressed, and the plates engage, coupling the utility connection components.

12 Claims, 3 Drawing Sheets

SELF-ALIGNING UTILITY AUTOCOUPLER

CROSS-REFERENCE TO RELATED APPLICATIONS

This application claims benefit of U.S. provisional patent application Ser. No. 61/101,319, filed Sep. 30, 2008, which is herein incorporated by reference.

BACKGROUND OF THE INVENTION

1. Field of the Invention

Embodiments described herein generally relate to an apparatus and method for coupling utilities.

2. Description of the Related Art

Utility connections such as water, gas, control, and electrical, required for certain processes or in certain systems are typically manually and individually coupled and decoupled. However, these methods pose numerous challenges. For example, if an operator fails to turn off the water supply prior to decoupling water connections, a leak may spring. The magnitude of such leaks will typically be great for larger industrial applications. Manually decoupling and coupling utilities one by one is also a time consuming process, requiring longer reconfiguration time, and resulting in longer downtime due to a loss of efficiency. Furthermore, this practice leads to higher incidences of misalignment of utility connections due to operator error. Misalignment can also lead to inadvertent mismatch of connection components, such as placement of a pump lid over a source lid, which can lead to damage to either component. In other instances, such utility connections may be automatically coupled and decoupled in discrete groups, such as coupling water connections separately from high voltage electrical connections. Consequently, yet another deficiency of current coupling systems is that high voltage connections are generally kept separate from water and control connections, necessitating separate connection steps and increasing downtime.

Therefore, there is a need for an apparatus and method of coupling and decoupling utility connections which targets all connections at once, minimizes leakage, has a higher degree of misalignment capability, is easier to use, avoids damage to utility components in case of unintentional misuse, and results in faster and more efficient coupling.

SUMMARY OF THE INVENTION

Embodiments described herein generally relate to apparatus and method for coupling utilities. In one embodiment, an apparatus for coupling utilities is provided comprising: a lower plate supported by a box, the lower plate having an aperture, at least one preloaded spring, at least one utility connection component, and a primary alignment pin projecting from a first surface of the lower plate, wherein the diameter of the primary alignment pin increases with proximity to the first surface; and an upper plate having a secondary alignment pin shorter than the primary alignment pin projecting from a first surface of the upper plate, an aperture, and at least one utility connection component, wherein the upper plate can move toward the lower plate with the first surfaces of the upper and lower plates facing one another so that the primary alignment pin passes through the aperture in the upper plate and the secondary alignment pin passes through the aperture in the lower plate, the at least one preloaded spring is compressed, and the upper and lower plates engage thereby coupling the utility connection components on the upper and lower plates.

In one embodiment, the box is coupled with a processing chamber and the upper plate is coupled with a lid of the processing chamber.

In another embodiment, the lower plate is supported on the box by at least one spring.

In another embodiment, the second alignment pin is stepped. In yet another embodiment, the upper plate has an offset center of gravity.

In another embodiment, the apparatus may comprise at least one water utility connection, at least one gas connection and at least one electrical utility connection. In another example, the at least one utility connection is self-sealing. In another embodiment, the apparatus may comprise a control utility connection.

In another embodiment, the apparatus may comprise a vacuum foreline connection. The vacuum foreline connection may be a floating tube assembly.

In another embodiment, a method of coupling utilities is provided comprising: supporting a lower plate with a box, the lower plate having an aperture, at least one preloaded spring, at least one utility connection component, and a primary alignment pin projecting from a first surface of the lower plate, wherein the diameter of the primary alignment pin increases with proximity to the first surface; lowering an upper plate having a secondary alignment pin shorter than the primary alignment pin projecting from a first surface, an aperture, and at least one utility connection component toward the lower plate with the first surfaces of the upper and lower plates facing one another; inserting the primary alignment pin through the aperture in the upper plate; inserting the secondary alignment pin through the aperture in the lower plate; compressing the at least one preloaded spring; coupling the utility connection components on the upper and lower plates; and engaging the upper and lower plates.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

It is contemplated that elements disclosed in one embodiment may be beneficially utilized in other embodiments without specific recitation.

DETAILED DESCRIPTION

Embodiments described herein provide a self-aligning autocoupler device that allows for fast and fail-safe utility coupling with minimal system downtime. Although discussed in relation to an in-line glass coating deposition chamber system, embodiments of the self-aligning autocoupler device may be used in any connection between a stationary chassis and a heavy moving assembly requiring a utility connection.

Figure 1:
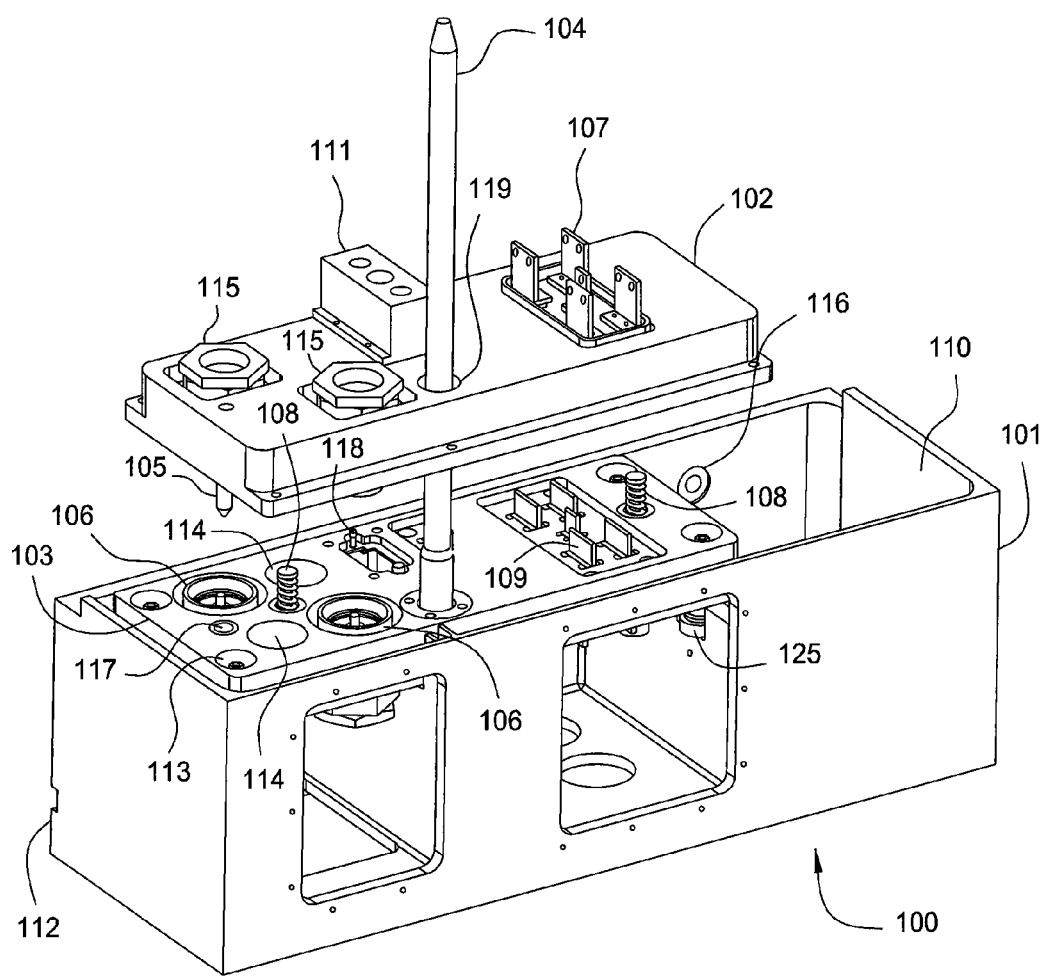
FIG. 1 is a top front view of one embodiment of a self-aligning utility autocoupler.

FIG. 1 is a schematic partial front and top view of a self-aligning utility autocoupler 100 in accordance with one embodiment described herein. The autocoupler 100 comprises two mating lids or plates, lower plate 103 and upper plate 102. Lower lid or plate 103 has at least one utility connection component on it. The utility connection is configured so that any hosing or wiring for the utility connects to the connection component underneath the lower plate 103. The utility connection may not be rigidly fixed to lower plate 103 and may exhibit some play or movement so as to assist in the self-alignment process. The utility connection can be a water, gas, electric, high voltage, or control connection. In other embodiments, lower plate 103 can have two utility connections, or three or more. For example, FIG. 1 shows an embodiment with water connections 106, control connections 118, and high voltage electrical connection 109. In one embodiment, a utility connection 114, such as for cooling lines, may be included in lower plate 103.

Figure 3:
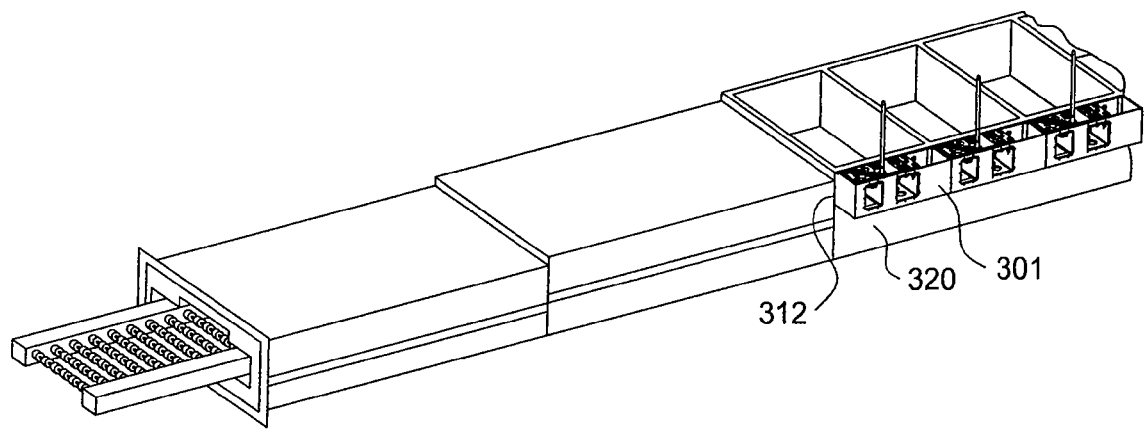
FIG. 3 is a side view of one embodiment of an in-line glass coating system with self-aligning utility autocouplers attached to a chamber of the system.

As shown in FIG. 1, lower lid or plate 103 is supported by a box 101. In one embodiment, lower plate 103 can be attached to box 101 using bolts through, for example, bolt hole 113. Box 101 can be made from stainless steel or aluminum, or may be constructed from other materials. In one embodiment, box 101 can be attached to the side of a chamber, such as a process chamber. As shown in FIG. 3, back face 312 of box 301 can bolt to a chamber side 320 (chamber lid not shown). In one embodiment, multiple autocouplers may be attached to the side of a process chamber in a continuous row, with each autocoupler corresponding to a different compartment within the process chamber. An example of a bolt hole which may be used to attach box 101 to a chamber side is shown at 116 in FIG. 1. In another example, box 101 can be attached to a stationary chassis requiring utility connections. Box 101 can have apertures on the side opposite the back face 112 for purposes of providing access to the interior of box 101. Box 101 can also have apertures on the bottom face opposite the top face upon which lower plate 103 rests. These apertures on the bottom face of box 101 can provide access and can allow utility lines to pass through box 101 and protrude out through the bottom of box 101.

As shown in FIG. 1, lower plate 103 can have a primary alignment pin 104 perpendicular to the plane formed by lower plate 103 and projecting upwards therefrom in a direction away from box 101. In one embodiment, the diameter of primary alignment pin 104 will increase with proximity to lower plate 103. In one embodiment, primary alignment pin 104 is stepped so that the diameter of primary alignment pin 104 above the step is smaller than the diameter of primary alignment pin 104 below the step. In other embodiments, primary alignment pin 104 can have one step, or two steps, or three steps or more. In yet another embodiment, primary alignment pin 104 can be tapered so that its diameter increases down the length of primary alignment pin 104 with proximity to lower plate 103. Primary alignment pin 104 may be further tapered at the distal end opposite lower plate 103. The diameter, length and composition of primary alignment pin 104 will depend on the application of the autocoupler, but primary alignment pin 104 should be strong enough to resist forces applied to it. In one embodiment, primary alignment pin 104 is bolted onto lower plate 103.

Lower plate 103 may comprise at least one preloaded spring plunger 108 through lower plate 103 so as to effectively overcome the resistance of separation and dragging forces and friction of mating components. Spring plunger 108 may be preloaded so as to ensure that the entire autocoupler assembly is compressed fully before it sets down. In other embodiments, lower plate 103 can comprise two or more preloaded spring plungers, as shown at FIG. 1.

Figure 2:
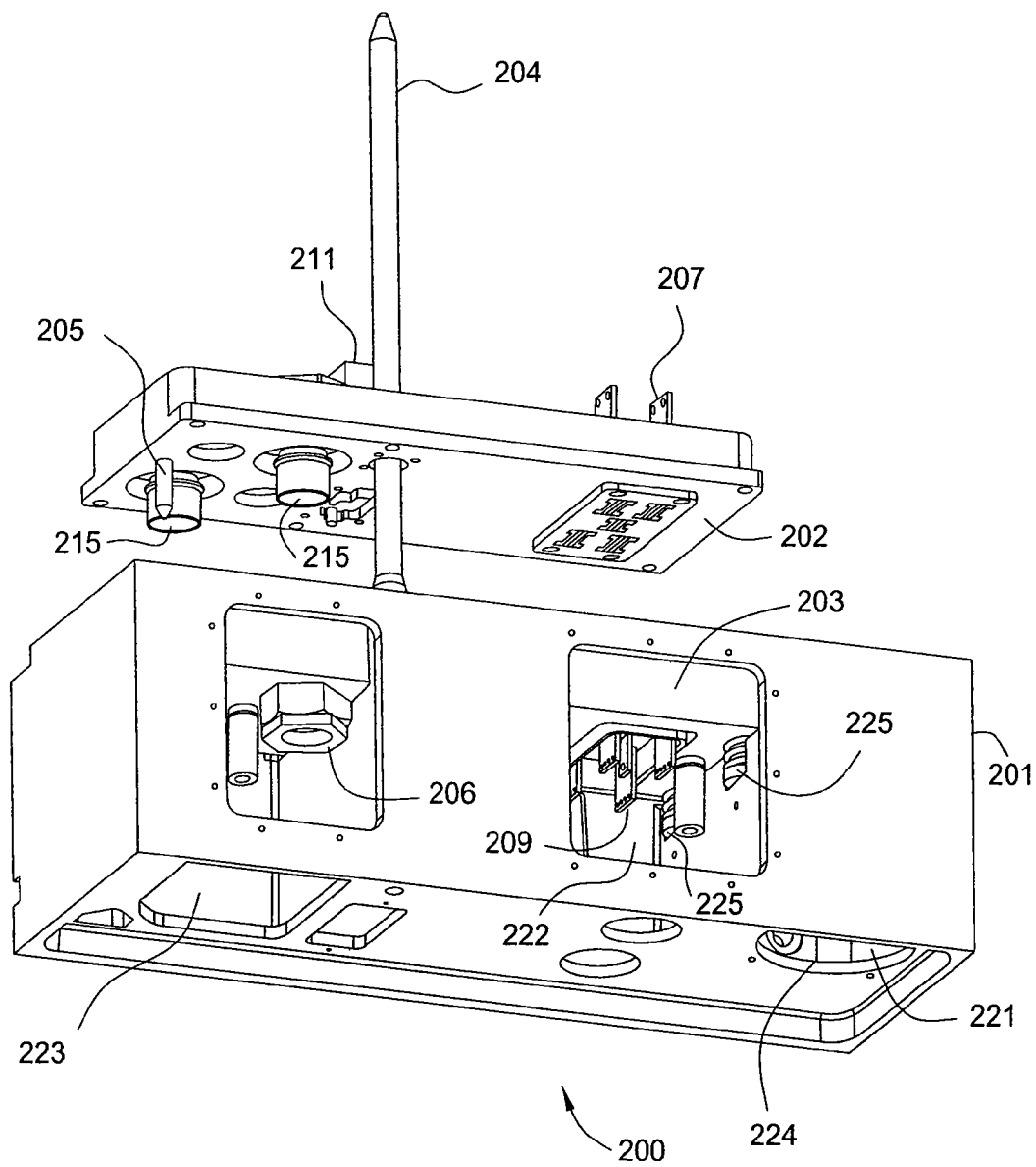
FIG. 2 is a bottom front view of one embodiment of a self-aligning utility autocoupler.

In one embodiment, lower plate 103 may be supported by at least one spring 125 (see also spring 225 in FIG. 2). Spring 125 can allow lower plate 103 to accommodate any minor parallel misalignment with upper plate 102. Lower plate 103 may also be supported by two, or three or four or more springs.

In one embodiment, lower plate 103 may occupy only part of the top face of box 101. Once lower plate 103 is mounted on box 101, a gap 110 may remain on the top face of box 101. Box 101 may have an aperture opposite gap 110 so that gap 110 can accommodate passage of other utility lines through box 101, such as a vacuum foreline.

As shown in FIG. 1, upper lid or plate 102 comprises at least one utility connection, such as 115, corresponding to the at least one utility connection, such as 106, on mating lower plate 103. The utility connection is configured so that hosing or wiring for the utility connects to the connection component on the top surface of the upper plate 102. The utility connection may not be rigidly fixed to upper plate 102 and may exhibit some play or movement so as to assist in the self-alignment process. The utility connection can be a water connection, gas connection, electrical connection, or control connection. The utility connection may be made of aluminum or stainless steel. Water connections may be made of brass. High voltage electric connections may be made of silver-plated brass. For example, FIG. 1 shows an embodiment with water connections 115, control connections 111, and high voltage electrical connection 107. In certain embodiments, upper plate 102 can have two utility connections, or three utility connections, or more. Upper plate 102 can have a secondary alignment pin 105 perpendicular to the plane formed by upper plate 102 and projecting downwards. Secondary alignment pin 105 may be shorter in length than primary alignment pin 104. Secondary alignment pin 105 may be further tapered at the distal end opposite upper plate 102.

In one embodiment, upper plate 102 can be bolted to the base of a lid of a processing chamber so that as the chamber lid is lowered over the chamber, upper plate 102 is simultaneously lowered over lower plate 103, which may be attached to box 101 which may be rigidly attached to the chamber side (see FIG. 3). In one embodiment, the chamber lid can be a source lid requiring a high voltage power source. In another embodiment, the chamber lid can be a source lid having an auxiliary cooling circuit. In another embodiment, the chamber lid can be a source lid having an auxiliary cooling circuit and vacuum pumps attached to it. In another embodiment, the chamber lid can be a turbo pump lid, having turbo pumps attached to it. Upper plate 102 can be lowered over lower plate 103 using a crane. In one embodiment, a crane can attach to inner connectors on a chamber lid to which upper plate 102 may be attached to facilitate lifting and lowering of the entire chamber lid/upper plate assembly. In another embodiment, upper plate 102 may be manually lowered. The method of lowering upper plate 102 may depend on the size and weight of upper plate 102, whether upper plate 102 is attached to another moveable component, the size and weight of that moveable component, and the application in which autocoupler 100 is being used. For example, a processing chamber lid, such as for a sputtering chamber in an in-line glass coating system, may measure approximately 3 feet by 3 feet by 13 feet and may be made from steel, in which case a crane may be used to lift and lower the chamber lid/upper plate assembly.

Upper plate 102 can be lowered so that the bottom face from which secondary alignment pin 105 projects faces the top face of lower plate 103 from which primary alignment pin 104 projects. In one embodiment, upper plate 102 can have an offset center of gravity, so as to ensure a controlled angle of engagement. In one embodiment, as upper plate 102 gets close to engagement, the offset center of gravity of upper plate 102 can provide an angle of engagement of less than 3 degrees. Upper plate 102 can be lowered so that primary alignment pin 104 passes through aperture 119 in upper plate 102. Initially, primary alignment pin 104 may fit loosely within aperture 119, allowing for a certain degree of angular and lateral misalignment. As upper plate 102 moves down primary alignment pin 104 and closer towards lower plate 103, the diameter of primary alignment pin 104 increases such that any clearance or space between primary alignment pin 104 and aperture 119 may be reduced, thereby resulting in less angular and lateral misalignment, and hence improved alignment. In one embodiment, as aperture 119 of upper plate 102 slides down primary alignment pin 104, it will meet a step on primary alignment pin 104 after which the diameter of primary alignment pin 104 is larger in size than the diameter of the segment of primary alignment pin 104 above the step. As explained above, primary alignment pin 104 may have one step, or two steps, or more steps. In another embodiment, as upper plate 102 slides down primary alignment pin 104, upper plate 102 will become further aligned as the space between primary alignment pin 104 and aperture 119 is minimized due to primary alignment pin 104 having a tapered shape with the diameter of primary alignment pin 104 increasing from top to bottom.

Once upper plate 102 is lowered to a certain distance above lower plate 103, secondary alignment pin 105 is positioned so that it slides into aperture 117 on lower plate 103. As plate 102 is lowered further, the insertion of secondary alignment pin 105 into aperture 117 may minimize rotational misalignment, or rotation in the horizontal plane of upper plate 102 with respect to lower plate 103, thereby improving the alignment between upper plate 102 and lower plate 103. As upper plate 102 is lowered further, and is brought closer to plate 103, it will cause preloaded spring plunger 108 to compress. Spring 125 may also compress slightly as upper plate 102 makes contact with lower plate 103. As upper plate 102 is lowered further, corresponding utility connections on plates 102 and 103 may be coupled or mated. In one embodiment, the utility connections may be sequentially made. For example, water connections 115 may first couple with water connections 106, followed by the coupling of high voltage electrical connection 107 with high voltage electrical connection 109, followed by the coupling of finer control connections 111 with control connections 118. Upper plate 102 may be brought further down upon plate 103, so that it will engage with lower plate 103 such that all connections are completed and upper and lower plates 102 and 103 are aligned parallel to one another.

FIG. 2 is a schematic partial front and bottom view of a self-aligning utility autocoupler 200 in accordance with one embodiment described herein. FIG. 2 shows the underside of one embodiment of upper plate 202, lower plate 203 and box 201 as upper plate 202 is being lowered towards lower plate 203 along primary alignment pin 204. In one embodiment, upper plate 202 may comprise a secondary alignment pin 205, water connections 215, control connections 211, and high voltage electrical connections 207. As shown in FIG. 2, the bottom face of box 201 may comprise apertures that allow for utility lines (not shown) to enter or exit box 201 to access utility connection components on the underside of lower plate 203. In one embodiment, as shown in FIG. 2, box 201 may comprise three chambers separated by two dividing walls (see also box 101 in FIG. 1). In one embodiment, one chamber 223 may house water connections 206, another chamber 222 may house control and high voltage electrical connections 209, and a third chamber 221 may accommodate a vacuum line. The separated chambers can allow for integration of different utility components, such as water, and electrical and control, in one autocoupler. Box 201 may have one chamber, two chambers, three chambers or more. In one embodiment, the apertures on the bottom face of box 201, such as aperture 224, may be rectangular, circular, elliptical or polygonal in shape, to accommodate utility lines running through box 201.

In one embodiment, a vacuum foreline (not shown) may come up through the rightmost chamber 221 of box 201. The vacuum foreline may be independent of plates 202 and 203. In one embodiment, the vacuum foreline may be a floating tube assembly with spring bellows wherein the bellows can allow for misalignment and spring-force contact with the bottom of the thermal pump lid. The bellows can allow an upper flange with a sealing O-ring to mate with the flat bottom of a chamber lid to which upper plate 202 may be attached.

In one embodiment, water and gas connection components may comprise self-sealing mechanisms to prevent leakage upon disengagement if, for example, the water or gas supply or return lines are not shut off prior to decoupling.

In another embodiment, the upper plate may be replaced by a different plate or lid comprising different utility connection components, depending on the application. In another embodiment, the lower plate may be replaced by a different lower plate comprising different utility connection components, depending on the application.

In one embodiment, each individual utility connection will have at least some degree of freedom within the plate to ensure optimal individual alignment and no residual binding forces between connections.

While the foregoing is directed to embodiments of the present invention, other and further embodiments of the invention may be devised without departing from the basic scope thereof, and the scope thereof is determined by the claims that follow.

What is claimed is:
1. An apparatus for coupling utilities comprising:
a lower plate supported by a box, the lower plate having an aperture, at least one preloaded spring, at least one utility connection component, and a primary alignment pin projecting from a first surface of the lower plate, wherein the diameter of the primary alignment pin increases with proximity to the first surface; and
an upper plate having a secondary alignment pin shorter than the primary alignment pin projecting from a first surface of the upper plate, an aperture and at least one utility connection component, wherein the upper plate can move toward the lower plate with the first surfaces of the upper and lower plates facing one another so that the primary alignment pin passes through the aperture in the upper plate and the secondary alignment pin passes through the aperture in the lower plate, the at least one preloaded spring is compressed, and the upper and lower plates engage thereby coupling the utility connection components on the upper and lower plates.
2. The apparatus of claim 1, wherein the box is coupled with a processing chamber and wherein the upper plate is coupled with a lid of the processing chamber.
3. The apparatus of claim 1, wherein the lower plate is supported on the box by at least one spring.
4. The apparatus of claim 1, wherein the second alignment pin is stepped.

5. The apparatus of claim 1, wherein the upper plate has an offset center of gravity.

6. The apparatus of claim 1, comprising at least one water utility connection, at least one gas connection and at least one electrical utility connection.

7. The apparatus of claim 1, wherein the at least one utility connection is self-sealing.

8. The apparatus of claim 1, comprising a control utility connection.

9. The apparatus of claim 1, further comprising a vacuum foreline connection.

10. The apparatus of claim 9, wherein the vacuum foreline connection is a floating tube assembly.

11. A method of coupling utilities comprising:
   supporting a lower plate with a box, the lower plate having an aperture, at least one preloaded spring, at least one utility connection component, and a primary alignment pin projecting from a first surface of the lower plate, wherein the diameter of the primary alignment pin increases with proximity to the first surface;
   lowering an upper plate having a secondary alignment pin shorter than the primary alignment pin projecting from a first surface of the upper plate, an aperture and at least one utility connection component toward the lower plate with the first surfaces of the upper and lower plates facing one another;
   inserting the primary alignment pin through the aperture in the upper plate;
   inserting the secondary alignment pin through the aperture in the lower plate;
   compressing the at least one preloaded spring;
   coupling the utility connection components on the upper and lower plates; and
   engaging the upper and lower plates.

12. The method of claim 11, further comprising compressing at least one spring supporting the lower plate on the box.

* * * * *